United States Patent
Gonzaga et al.

(10) Patent No.: US 8,322,007 B2
(45) Date of Patent: Dec. 4, 2012

(54) LOAD HANDLING DEVICE

(75) Inventors: Tullio Gonzaga, Correggio (IT); Silvano Santi, Imola (IT)

(73) Assignee: Butler Engineering & Marketing S.p.A. (IT)

( * ) Notice: Subject to any disclaimer, the term of this patent is extended or adjusted under 35 U.S.C. 154(b) by 491 days.

(21) Appl. No.: 12/403,121

(22) Filed: Mar. 12, 2009

(65) Prior Publication Data
US 2010/0232916 A1    Sep. 16, 2010

(51) Int. Cl.
B23P 19/04  (2006.01)
B21D 53/26  (2006.01)
B60C 25/132  (2006.01)
B65G 1/137  (2006.01)

(52) U.S. Cl. ...... 29/257; 29/894.31; 157/1.17; 157/1.28
(58) Field of Classification Search .............. 29/257, 29/894.31; 157/1.28, 1.17
See application file for complete search history.

(56) References Cited

U.S. PATENT DOCUMENTS

| | | | |
|---|---|---|---|
| 1,239,420 A * | 9/1917 | Mella | 29/763 |
| 5,226,465 A * | 7/1993 | Schon et al. | 157/1.28 |
| 6,880,606 B2 * | 4/2005 | Gonzaga | 157/1.28 |
| 6,886,619 B2 * | 5/2005 | Gonzaga | 157/1.28 |
| 7,089,987 B2 * | 8/2006 | Gonzaga | 157/14 |
| 7,188,656 B2 * | 3/2007 | Gonzaga | 157/1.17 |
| 7,296,351 B2 * | 11/2007 | Gonzaga | 29/894.31 |
| 7,341,090 B2 * | 3/2008 | Gonzaga | 157/1.17 |

FOREIGN PATENT DOCUMENTS

| | | |
|---|---|---|
| DE | EP 0 499 825 A2 | 8/1992 |
| IT | EP 1 479 538 A2 | 11/2004 |
| IT | EP 1 584 495 A2 | 12/2005 |

OTHER PUBLICATIONS

European Search Report—EP 09 15 2540; May 18, 2009, 5 pages.

* cited by examiner

*Primary Examiner* — Lee D Wilson
*Assistant Examiner* — Alvin Grant
(74) *Attorney, Agent, or Firm* — Stephen B. Salai, Esq.; Brian B. Shaw, Esq.; Harter Secrest & Emery LLP

(57) ABSTRACT

A handling device for a resistant load includes a guide track (2) or a plurality of parallel guide tracks, a pair of slides or carriages (10a, 10b) slidingly mounted on a guide track (2) or a respective guide track, removable locking means (6a, 6b) associated with each slide or carriage (10a, 10b) and designed to keep in position its respective slide or carriage along the respective guide track (2), a linear actuator means (3) associated with each slide or carriage (10a, 10b) and having at least one first component (4) and at least one second component (5a) which can be displaced, upon control, one with respect to the other parallely to the guide track (2) or plurality of parallel guide tracks, the at least one first component (4) being displaceable together with a slide or carriage (10a) of the pair, and the at least one second component (5a) being displaceable together with the other slide or carriage (10b) of the pair, engagement means (7a, 7b) for a resistant load displaceable together with the linear actuator means, and control means designed to control the removable locking means (6a, 6b) and the linear actuator means (3).

15 Claims, 1 Drawing Sheet

LOAD HANDLING DEVICE

FIELD OF INVENTION

The present invention relates to a resistant-load handling device having in particular one or more work arms and being particularly suitable for handling two arms designed to support a tire bead releasing, assembling or disassembling tools for vehicle tires.

BACKGROUND OF INVENTION

Work arms, e.g. of tire assembling-disassembling machines or plate/plane support arms, such as raising machine arms (e. g. cranes) designed to displace loads between different levels, are suitably handled by means of an actuator comprising, for example, a fluid-operated group having its cylinder anchored to a base (e. g. a base of a crane) and a piston rod protruding from the cylinder, whose free end is designed to support a work arm.

First of all, with such a solution a jack or another linear actuator for each working arm should be used. Moreover, when very high levels are to be reached, or loads are to be moved between two quite distant levels, a jack suitable for carrying out a stroke of considerable length must be used, which involves high costs. However, if the jack does not work in a vertical trim, a bending moment approximately proportional to the length of the jack occurs at the free end of the stem. Thus, a substantial resistant force arises, that must be overcome to obtain a stable and safe operation of the load handling device.

So far as the specific field of the tire assembling-disassembling machines is concerned, as it is known, such machines usually comprise a base, a wheel support table mounted for rotation on the base, one or more columns rising from the base, and one or more work arms cantileverwise extending from the or each column, each work arm being designed to support a respective tool at the free end thereof. Such tools are the so-called "bead releasing tools", that are employed to bead release, i. e. to detach the beads of a tire mounted on a wheel rim from its respective wheel rim edge. One or more work arms, generally extendable-retractable arms, generally extend from the column or columns, and each supports a respective assembling-disassembling tool designed to assist in mounting/dismounting operations by forcing a tire bead engaged by the tool to follow a pre-determined path by causing the engaged edge of the tire to be deformed so as to force it to pass over the wheel rim edge facing it.

Each work arm is controlled by a respective linear actuator, usually a pneumatic jack.

During tire assembling-disassembling operations a plurality of tools, typically two tools, must be simultaneously operated sometimes, and this obviously results in the need of operating as many actuators as are bead releasing tools to be controlled.

To this end, some tire assembling-disassembling machines are provided with bead releasing tools designed to be simultaneously or separately operated on opposite sides of a tire, e. g. when bead releasing, assembling or disassembling operations are to be accomplished.

SUMMARY OF THE INVENTION

The main object of the present invention is to provide a device suitable for handling a load along a track by means of a pair of movable elements moving along the track and one linear actuator having a length shorter than the load handling displacement.

Another object of the present invention is to provide a tire assembling-disassembling machine provided with a handling device designed to handle a pair of work arms, which can be operated by means of one linear actuator.

Another object of the present invention is to provide a tire assembling-disassembling machine provided with a handling device suitable for reducing the manufacturing and maintenance costs of the machine with respect to prior art machines.

According to a first aspect of the present invention there is provided a resistant load handling device comprising:

- a guide track or a plurality of parallel guide tracks;
- a pair of slides or carriages slidingly mounted along a guide track or a respective guide track;
- removable locking means associated with each slide or carriage and designed to keep the respective slide or carriage in fixed position along its respective guide track;
- a linear actuator means associated with each slide or carriage and having at least one first component and at least one second component which can be displaced, upon control, one with respect to the other parallely to the guide track or plurality of parallel guide tracks, the at least one first component being movable together with a slide or carriage of the pair, and the at least one second component being movable together with the other slide or carriage of the pair;
- engagement means for a resistant load displaceable together with the linear actuator means; and
- control means designed to control the removable locking means and the linear actuator means.

According to another aspect of the present invention there is provided a tire assembling-disassembling machine which comprises a handling device in accordance with the present invention.

According to a further aspect of the present invention there is provided a method of handleing a load, which comprises the following working step sequence:

- unlocking a locking means of one or first slide or carriage of a pair, while the other or second slide or carriage of the pair is kept locked,
- energizing the linear actuator means of the slide or carriage pair to cause a slide or carriage to be displaced along the track,
- locking the actuator means and simultaneously energizing a locking means for the displaced slide or carriage,
- unlocking the locking means of the second slide or carriage of the pair while the locking means of the first slide is kept locked,
- re-energizing the actuator means of the slide or carriage pair to cause the slide or carriage to be displaced along the track in the same direction as the first slide or carriage; and
- stopping the actuator means and simultaneously actuating the locking means of the displaced second slide or carriage, and so on.

BRIEF DESCRIPTION OF THE DRAWINGS

Further aspects and advantages of the present invention will better appear from the following detailed description of preferred embodiments of a handling device as illustrated in the accompanying drawings, in which.

DETAILED DESCRIPTION OF THE PREFERRED EMBODIMENTS

Figure 1:
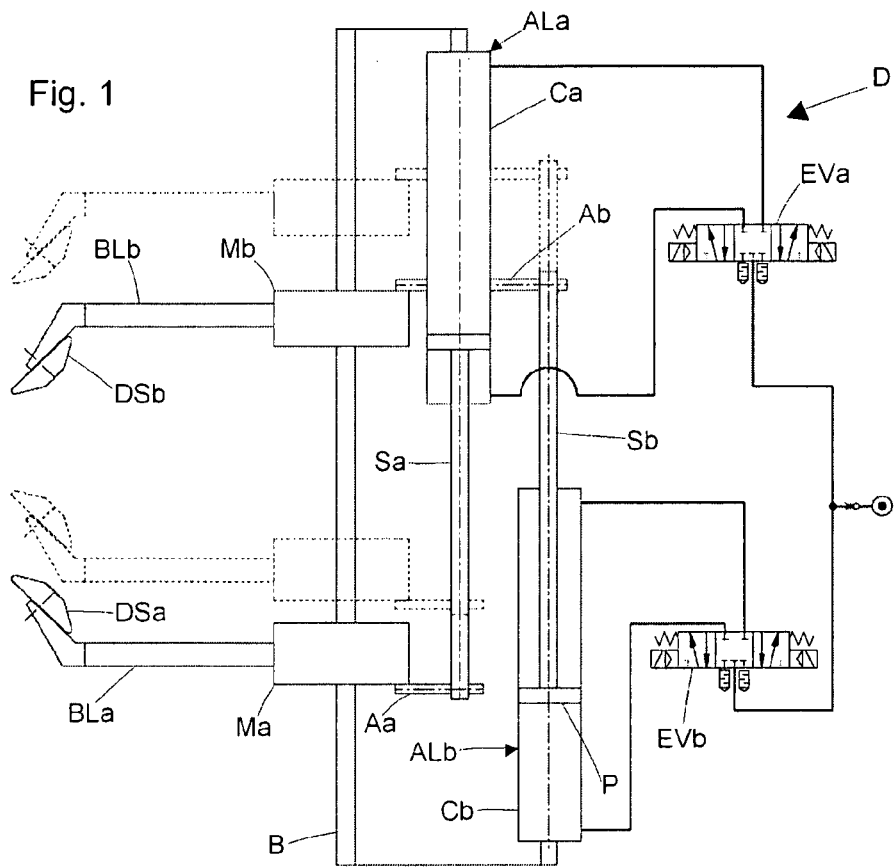
FIG. 1 is a diagrammatic side elevation view of a handling device for a pair of work arms in accordance with the prior art.

With reference first to FIG. 1, a device D for handling a pair of work arms BLa, BLb according to the prior art has been schematically shown, which comprises a support structure B, two linear double-acting piston-cylinder actuators, e. g. two pneumatic jacks ALa, ALb, each jack comprising a cylinder Ca, Cb and a respective piston rod Sa, Sb which protrudes therefrom and is controlled by a piston P slidingly mounted into the cylinder. The cylinder of each actuator is secured, e. g. welded, to the support structure B. The two actuators are arranged parallel but opposite to one another, i. e. the actuator ALa has its piston rod Sa extending in one direction and that of the actuator ALb in the opposite direction.

Each piston rod Sa, Sb is fixed at its free end, e. g. by means of a respective support rod Aa, Ab, to a sleeve Ma, Mb, respectively, slidingly mounted on a guide track PS extending parallel to the actuators ALa and ALb and supporting a respective cantileverwise-extending work arm BLa, BLb, which supports at its free end a tool, e. g. a bead releasing disc DSa, DSb, respectively.

The handling device D further comprises a compressed air source in fluid communication with two electro-valves EVa, EVb, each of which is, in turn, in fluid communication with the two ends of a respective cylinder Ca, Cb.

With this arrangement, upon feeding compressed air to the device D and suitably switching the electro-valves EVa, EVb, compressed air can be supplied to one side or the other of the jacks to control the extension/retraction of each piston rod Sa, Sb, i. e. the moving away-approaching displacement of the work arms BLa and BLb.

A handling device of this type thus requires so many linear actuators as work arms to be displaced, and this obviously involves high manufacturing and maintenance costs for a tire assembling-disassembling machine.

Figure 2:
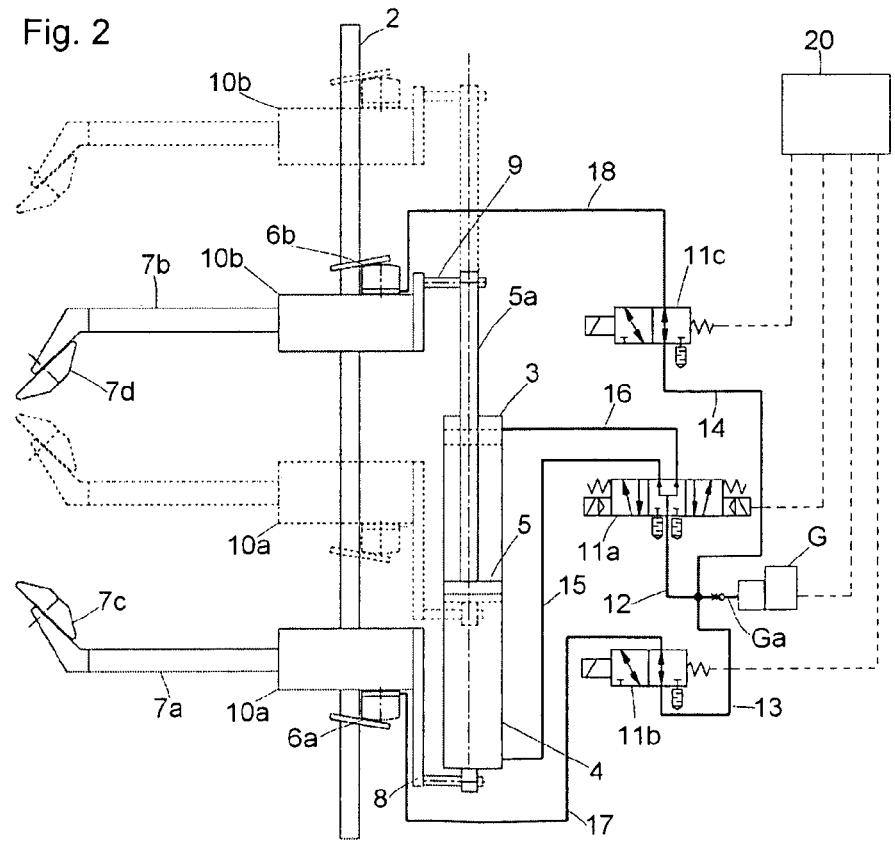
FIG. 2 is a diagrammatic side elevation view of a handling device for a pair of work arms in accordance with the present invention.

FIG. 2 shows a device 1 for handling two work arms 7a, 7b according to the present invention.

Such a device comprises:

a column or upright 2 which is a slide guide track;

a pair of slides or carriages 10a, 10b slidingly mounted on the guide track 2;

a linear actuator means which extends substantially parallel to the column or upright 2 and comprises at least one first component and at least one second component; the linear actuator for example comprises a pneumatic cylinder-piston group or double acting jack 3 of any suitable type including a cylinder 4, a piston 5 slidingly mounted in the cylinder and a piston rod 5a rigid with the piston 5;

removable locking means, e. g. comprising two stop clamping elements 6a, 6b of any suitable type, typically of a pneumatically controlled type, the clamping elements being removably engageable with the column or upright 2 and supported by a respective slide or carriage 10a, 10b;

control means, e. g. comprising a control board 20, including a plurality of controls, such as a knob, a lever, a joy-stick and the like, and designed to control the stop clamping elements 6a and 6b and the double acting jack 3; and engagement means designed to engage a resistant load, and typically comprising a pair of work arms 7a, 7b, each rigid with a respective slide 10a and 10b, and thus with the cylinder 4 and the piston rod 5a, respectively, as further explained below.

The arms 7a, 7b extend in the same direction with respect to the column or upright.

More particularly, the clamping element 6a is fixed to the slide 10a, which, in turn, is secured to, and supports, e. g. through a bracket 8, the cylinder 4, whereas the clamping element 6b is fixed to the slide 10b, which, in turn, is secured to the piston rod 5 by means of a bracket 9.

The work arms 7a and 7b can be of any suitable type, e. g. comprising telescopic arms and supporting a frusto-conical bead releasing tool 7c and 7c, respectively, at the free end thereof, or at least one of them can comprise a hoisting platform, should the handling device be designed to raise-lower a load.

The linear actuator 3 may be of any suitable type, e. g. a fluid-operated jack, such as that shown in the drawings, or a rack (first component) and pinion (second component) type, the pinion being controllable by a reversible motor.

If a linear actuator of the fluid-operated jack type is adopted, the handling device also includes a pressurized fluid, e. g. compressed air, source or generator G, preferably provided with an outlet check valve Ga, and three valve groups, preferably three electro-valves, i. e.:

a first three-way electro-valve 11a, in fluid communication with the outlet of the check valve Ga of the generator G through a duct 12 and designed to supply pressurized fluid either to one end, e. g. by means of a duct 15, or to the other, e. g. by means of a duct 16, of the double acting jack 4, a second electro-valve 11a, preferably a two-way electro-valve, also in fluid communication through a duct 13 with the outlet of the check valve Ga of the generator G and designed to pneumatically control through a duct 17 the clamping element 6a associated with the slide or carriage 10a; and a third electro-valve 11c, preferably a two-way electro-valve, which is also in fluid communication through a duct 14 with the outlet of the check valve Ga of the generator G, and designed to pneumatically control, through a duct 18, the clamping element 6b associated with the slide or carriage 10b.

The electro-valves 11a, 11b and 11b can be controlled from the control board 20 to which it is electrically connected, the control board preferably comprising a suitable on-off control (not-shown) for energizing-stopping the generator G, as schematically shown in the drawing. The control board can also comprise a control signal transmission unit, e. g. radio, infra-red or the like signals.

A handling device according to the embodiment shown on FIG. 2, is suitable for causing the arms 7a, 7b to be displaced, either moved together, or away from one another, and particularly one of the arms 7a, 7b to be raised or lowered, while keeping the other standstill when the column or upright 2 is held in a substantially vertical trim. In order to raise the upper arm 7b, while keeping the arm 7a standstill:

generator G is possibly energized (unless a compressed air storing tank is available), locking of the clamping element 6a through the electro-valve 11b and unlocking of the clamping element 6b through the electro-valve 11c is controlled from the control board 20, the electro-valve 11a is then controlled, thereby feeding the lower end of jack 3 with compressed air through the electro-valve outlet in fluid communication with the duct 15, whereas the electro-valve outlet in fluid communication with the duct 16 makes it possible to discharge air from the upper end of the jack 5.

At this point, the piston 5 and thus the arm 7b starts raising up to a maximum level in relation to the stroke of the piston 5, at which level the electro-valve 11a is closed, thus stopping the jack 5. For further raising the arm 7b beyond the level thus reached, it is first necessary to lock the clamping element 6b through the electro-valve 11c, and unlock the clamping element 6a through the electro-valve 11b, and then the electro-valve 11a is switched so that compressed air from the source G is fed to its outlet in fluid communication with the duct 16, and through its outlet in fluid communication with the duct 15 air is discharged from the lower end of jack 5.

Since the piston is fixed with respect to the column or upright 2, it will be the cylinder 4 that is caused to raise up to the maximum stroke of the piston 5, after which the electro-valve 11a will prevent the cylinder from further raising. The sequence may be repeated throughout the height of the column or upright 2.

If an inverse sequence is followed, the arm 7b or both arms 7a and 7b are caused alternatively to lower stepwise, or the arm 7a is caused to raise.

In order to move together or away from one another the arms 7a and 7b, one of them is locked by means of its clamping element, while the other is displaced.

A handling device according to the present invention makes it possible to control the movements of at least one or preferably two work arms by means of one linear actuator only, this resulting in advantages from the manufacturing and maintenance view points in a machine provided with the above-described handling device.

Should a handling device in accordance with the present invention be used in a tire assembling-disassembling machine, it will be understood that the guide track 2 is substantially parallel to the axis of rotation of the tyred-wheel or wheel rim support table to make it possible for the arms 7a and 7b to act as bead releasing arms controlled by one pneumatic jack.

As it will be apparent to a person skilled in the art, a handling device in accordance with the present invention may be used as a load raising-lowering device.

With a handling device in accordance with the present invention it is not necessary to use a long-stroke jack, and thus the tip of the piston rod, particularly when it is in a full extension condition, does not undergo severe bending moments, and even very substantial raising heights can be reached by repeating the above mentioned stepwise raising steps.

The above-described device is susceptible to numerous modifications and variations within the scope as defined by the claims.

Thus, for example the piston-cylinder group may comprise a double acting jack or a spring loaded single acting jack and the like.

The handling device may comprise a plurality of guide racks 2, on each of which a pair of slide or carriage elements provided with a respective removable stopping element, e. g. a clamping element is slidingly mounted.

The invention claimed is:

1. A handling device for a resistant load comprising:
a guide track;
a pair of slides or carriages slidingly mounted on the guide track or a respective guide track;
a first removable locking associated with a slide or carriage of said pair, and a second removable lock associated with the other slide or carriage of said pair, each of said first and second removable locks being designed to keep in position its respective slide or carriage along the respective guide track;
one linear actuator associated with both slides or carriages and having at least one first component and at least one second component which can be displaced, upon control, one with respect to the other parallel to said guide track or respective guide tracks, said at least one first component being displaceable together with a slide or carriage of said pair, and said at least one second component being displaceable together with the other slide or carriage of the pair;
engagement means for a resistant load displaceable together with said linear actuator; and
a controller connected to said removable lock and said linear actuator.

2. A handling device as claimed in claim 1 comprising a plurality of parallel guide tracks.

3. A handling device as claimed in claim 1, wherein said removable lock comprises a clamp.

4. A handling device as claimed in claim 1, wherein said linear actuator comprises at least one double-acting fluid-operated piston-cylinder group and at least one pressurized fluid source controllable by said controller.

5. A handling device as claimed in claim 4, wherein said controller comprises:
a first three-way valve group in fluid communication with said at least one pressurized fluid source and designed to supply, upon control, pressurized fluid either to one or the other end of said at least one double acting fluid-operated group,
a second valve group in fluid communication with said pressurized fluid source and designed to control a respective lock associated with a slide or carriage of said pair;
a third valve group in fluid communication with said pressurized fluid source and designed to control a respective lock associated with the other slide or carriage of said pair; and
a controller connected to at least said first, second and third valve groups.

6. A handling device as claimed in claim 5, wherein said controller is electrically connected to said first, second and third valve groups.

7. A handling device as claimed in claim 5, wherein said controller is electrically connected to, and controls said pressurized fluid source.

8. A handling device as claimed in claim 5, wherein said controller remotely controls said first, second and third valve groups.

9. A handling device as claimed in claim 5, wherein said controller remotely controls said pressurized fluid source.

10. A handling device as claimed in claim 1, wherein said linear actuator comprises a rack and pinion group, the pinion or the rack being controllable by a reversible motor.

11. A handling device as claimed in claim 1, wherein said engagement means comprises at least one cantilever work arm displaceable together with a respective slide or carriage.

12. An assembling-disassembling machine, comprising a handling device as claimed in claim 1.

13. A machine as claimed in claim 12, wherein said guide track comprises a column or upright member and said pair of slides or carriages comprises a respective cantilever arm designed to support a respective work tool, said cantilever arms protruding from the same side of said column or upright unit.

14. A load handling method by means of a device as claimed in claim 1, comprising the following operating sequence:
  unlocking a lock of one or first slide or carriage of a pair, while the other or second slide or carriage of the pair is kept locked,
  energizing a linear actuator of the slide or carriage pair to cause a slide or carriage to be displaced along said track,
  locking said actuator and simultaneously energizing a lock for the displaced slide or carriage,
  unlocking the lock of the second slide or carriage of the pair while the lock of the first slide is kept locked,
  re-energizing the actuator of the slide or carriage pair to cause the slide or carriage to be displaced along said track in the same direction as the first slide or carriage; and
  stopping said actuator and simultaneously actuating the lock of the displaced second slide or carriage, and so on.

15. A handling device as claimed in claim 1, wherein said controller controls said removable locking means and said linear actuator means.

* * * * *